United States Patent [19]

Rosenbaum et al.

[11] 4,384,329

[45] May 17, 1983

[54] RETRIEVAL OF RELATED LINKED LINGUISTIC EXPRESSIONS INCLUDING SYNONYMS AND ANTONYMS

[75] Inventors: Walter S. Rosenbaum, Bethesda; Alan R. Tannenbaum, Washington Grove, both of Md.

[73] Assignee: International Business Machines Corporation, Armonk, N.Y.

[21] Appl. No.: 218,222

[22] Filed: Dec. 19, 1980

[51] Int. Cl.³ .............................................. G06F 15/40
[52] U.S. Cl. ..................................................... 364/300
[58] Field of Search ... 364/200 MS File, 900 MS File, 364/300, 419

[56] References Cited

U.S. PATENT DOCUMENTS 4,218,760  8/1980  Levy ..................................... 364/900
4,270,182  5/1981  Asija ............................... 364/300 X Primary Examiner—Raulfe B. Zache
Attorney, Agent, or Firm—John W. Henderson, Jr.

[57] ABSTRACT

A storage method and control system for storing and interactively accessing a large data base of related linguistic expressions such as synonyms and antonyms. The data base structure includes a stored ordered vocabulary of the linguistic expressions and a stored N×N binary matrix defining the relationship between the expressions in the vocabulary. Address indexes are associated with the vocabulary and binary matrix to enhance access times. The control system controls a programmable digital processor to receive an input linguistic expression and access the binary matrix to generate linkages to the related linguistic expressions in the vocabulary. The related linguistic expressions in the vocabulary are concatenated and displayed for operator review.

7 Claims, 3 Drawing Figures

| | 1 | 2 | 3 | 4 | 5 | 6 | 7 | 8 | 9 | 10 | RUN LENGTH FORMAT |
|---|---|---|---|---|---|---|---|---|---|---|---|
| APHORISM | 1 | | | | | | | | 1 | 1 | RL(9), RL(1) |
| APPAREL | 2 | | 1 | | | | | | | | RL(3) |
| CLOTHES | 3 | 1 | | | | | | | | | RL(2) |
| DWELLING | 4 | | | | | | | 1 | | | RL(7), RL(1) |
| ELECTRIFY | 5 | | | | | 1 | | | | | RL(6) |
| ENTHUSE | 6 | | | | 1 | | | | | | RL(5) |
| HOME | 7 | | | 1 | | | | 1 | | | RL(4), RL(4) |
| HOUSE | 8 | | | 1 | | | 1 | | | | RL(4), RL(3) |
| MAXIM | 9 | 1 | | | | | | | 1 | | RL(1), RL(9) |
| SAYING | 10 | 1 | | | | | | | | 1 | RL(1), RL(8) |

FIG. 3

RETRIEVAL OF RELATED LINKED LINGUISTIC EXPRESSIONS INCLUDING SYNONYMS AND ANTONYMS

BACKGROUND OF THE INVENTION

1. Field of the Invention

This invention relates generally to text processing systems and, more particularly, to a system control and storage method for interactively prompting an operator with the synonyms or antonyms of a word during document preparation or revision.

2. Description of the Prior Art

In implementing office systems and their expansion to principal support terminals, the cost displaceable benefits of such systems are highly dependent on automating functions that would normally be done manually and repetitively during document composition or editing. Examples of such functions, that can now be performed for the operator by virtue of the computer facilities in an office system, are automatic hyphenation, spelling verification and spelling correction. These functions enable the operator to enter text more reliably and to find misspelling or typographical errors in the text. A logical extension to the automated text processing technology to aid the operator or principal in composing a document is an automatic thesaurus. Such a function would prompt the operator with alternate ways of expressing a word or idea, e.g. synonyms. This requires storing on-line the information content of a thesaurus type dictionary.

Procedures have been developed in the prior art to perform some aspects of a synonym generation function. The simplest approach amounts to storing word for word the contents of a synonym dictionary. The information and synonymy are then accessed by the key words of the dictionary or thesaurus index. This synonymic data base approach leads to a high degree of redundancy, massive storage requirements, and no ability to cross reference between synonym entries or to access any other words in the data base except those that have been chosen as the set of index terms.

Another method for automatic synonym generation provides a linked data base. This requires that every word in the data base have a pointer to the next word to which it is related. Similarly, a word may have several pointers to other words to create an inverted data base. In theory, the linked data base can be entered at any word, and followed through to all of the words that bear a synonymic relationship to that word. The penalty paid for this flexibility is the enormous amount of storage required for the pointers that allow cross referencing within the data base. Implementation of an antonym dictionary requires a totally separate vocabulary data base with the link entries rearranged to provide antonymy. Because of the voluminous data involved in such a data base, and the many cross references involved in synonymy, such a function has not heretofore been practical within the price and performance requirements for text processing systems.

SUMMARY OF THE INVENTION

An improved method for synonym and antonym data base structures and text processing system control for interactively accessing these data base structures is implemented by devising a symmetric binary matrix storage organization which creates a word-wise relational data base linking the respective entries in a word list for retrieval while using minimum storage and without incurring entry redundancy. The method for data base structure includes devising a $N \times N$ binary matrix where N is equal to the number of words in the vocabulary. The words are numbered to correspond to the row positions in the horizontal axis of the matrix such that the word numbers may be used as addresses to the matrix. Each vertical column in the matrix also corresponds to the number of words in the synonym or antonym dictionary. Each row has a binary "1" bit set in the column position corresponding to each other word that is a synonym or antonym for the word defined by the row. All other positions in the row are set to binary "0". The overall size of the matrix is reduced by run-length encoding the number of column positions between "1" bits in each row. The control system receives a word whose synonyms or antonyms are requested. The matrix row corresponding to the input word is accessed for binary "1" bits. A count is accumulated for the displacement into the row of each binary "1" bit. The accumulated count is used to access the corresponding words which are the synonyms or antonyms for the input word. The accessed words are output by the control system and displayed to an operator.

BRIEF DESCRIPTION OF THE DRAWING

FIG. 3 is a map of the storage organization of the binary vocabulary matrix.

DESCRIPTION OF THE PREFERRED EMBODIMENT

Figure 1:
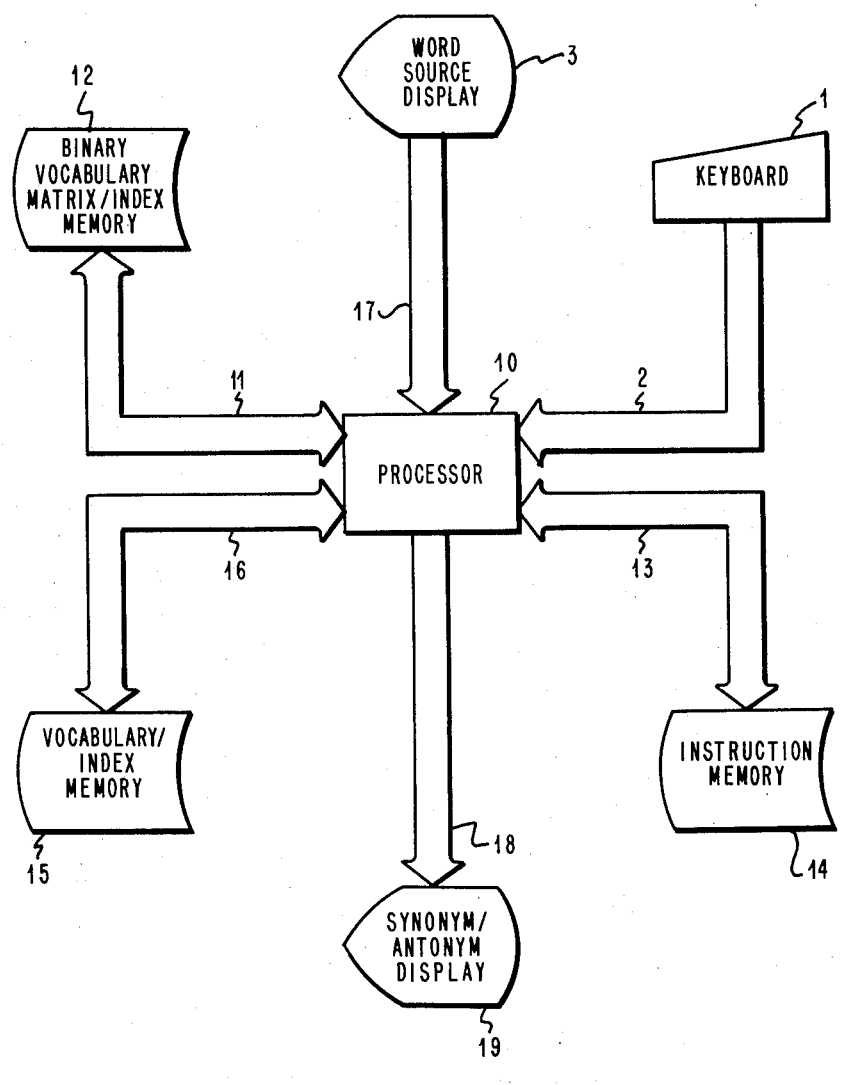
FIG. 1 is a block diagram of some components in a text processing system.

Referring to FIG. 1 there is shown a block diagram of some components in a text processing system including a CPU or processor 10 of the general purpose type which is in a two-way communication over a bus 13 with a memory 14 containing the program instructions which control the operation of the processor 10. The processor 10 is also in two-way communication with a memory 12 over bus 11. The memory 12 contains the binary vocabulary matrix (BVM) which includes the binary encoded synonymic and antonymic relationships of the vocabulary stored in memory 15. The structure of the BVM memory 12 will be discussed in more detail below. The vocabulary memory 15 which is also in two-way communication with processor 10 over bus 16 contains the list of text words whose synonymic and antonymic relationships are represented in memory 12. Both BVM memory 12 and vocabulary memory 15 contain indexes to enhance access time as will be discussed more fully below.

Text words or linguistic expressions are input to the text processing system over bus 17 from a conventional interactive data source such as keyboard 1, or other device, e.g. a cursive script tablet, character recognition device, electronic storage device, or voice recognition device. The text words thereby inputted will normally take the form of a composition being prepared on a display 3. An operator can select a particular word on the screen of display 3 in a conventional manner by using keyboard 1 to advance a cursor to the desired word. A selected word is transmitted over bus 17 to processor 10 when the operator has determined that for purposes of improved readability or understandability a synonym or antonym of the selected word would be preferable. This transmission is initiated by pressing a keybutton or combination of keybuttons on keyboard 1 which produces a signal to the processor 10 on bus 2. The processor 10, under the control of the instructions in the instruction memory 14, then accesses the BVM memory 12 over bus 11 and the vocabulary memory 15 over bus 16 to produce a list of synonyms or antonyms for the input word.

The structure of the binary vocabulary matrix (BVM) will now be discussed. The BVM is organized as a N×N matrix where N is equal to the number of words in the vocabulary. The row/column designations of the BVM matrix are symmetric. Hence, given for example the vocabulary: aphorism, apparel, clothes, dwelling, electrify, enthuse, home, house, maxim, saying, the synonym relations map into a 10×10 BVM as shown in FIG. 3.

Each BVM row contains "on" (1) bits corresponding to the relative word list position of a synonym. For example, row 1 corresponds to the word "aphorism". In that row, column positions 9 and 10 are "on"; hence words "maxim" and "saying" are synonyms of "aphorism". The BVM, therefore, represents a word-wise, totally inverted (relational) data base organization. A synonym's location in the vocabulary word list is mapped from its displacement in a BVM row. A separate, but identically organized, BVM memory structure is required for antonyms.

Although the BVM organization facilitates synonym or antonym identification and retrieval, it is obvious that the matrix can grow prohibitively large. To address this problem, advantage is taken of the sparse nature of the "on" bits in the rows and run-length encoding is used. A run is defined as the number of matrix columns between "on" bits. The technique used for run-length encoding in the BVM will now be described.

Run-lengths between 1 and 127 are represented in one 8-bit byte. The high-order bit is set to "0" and the low-order 7 bits contain the run's length. As shown below, this 8-bit field does not necessarily begin on a byte boundary, but operates on either a byte or half-byte boundary.

Run-lengths between 128 and 1151 are represented in 1½ bytes (12 bits). The high-order bit of the high-order 8 bits is set to "1" to indicate concatenation of an additional 4-bit field. The high-order bit of the 4-bit field is set to "0". The remaining 10 bits (7 from the first byte and the 3 from the ½ byte) are concatenated to form the run-length.

The process continues in 4 bit increments until a bit string of sufficient size to contain the length to be spanned is evolved. The high-order bit of each additional 4-bit field is set to "1" to denote concatenation of an additional 4-bit field. The high order bit of the last 4-bit field is set to "0" to indicate that no additional 4-bit fields follow. Only the low-order 3 bits of each 4-bit field are added to the end of the string of bits being constructed.

Run-length zero (8 bits, all "0") acts as a "stop code" to indicate that no more "on" bits remain in the row. The remaining "off" bits are ignored. The encoding of the BVM continues immediately with the run-length to the first synonym ("on" bit) of the next word in the vocabulary word list. Alternately depending on the distribution of BVM "on" bits, a fixed-length Run-Length Encoding Scheme (e.g., 2-bytes per encoding) can be used.

Depending upon the complexity of the synonym relationships that are stored in the BVM, it may be desired that the synonyms of an input word be output with respect to their decreasing affinity to the input word. This implies that the synonyms will not necessarily be output in alphabetical order as they are relatively positioned within the synonym vocabulary resident in memory 15. The affinity ordering of respective synonyms is accomplished in the BVM by modifying the previously described displacement encoding so as to include a 1-bit flag appended to each run-length encoding to indicate whether the displacement is positive or negative. When the flag bit is a binary "1", a positive displacement is indicated. A positive displacement means that the next word in affinity order is also in alphabetical order. A negative displacement or binary "0" flag bit means that the affinity order contradicts alphabetical order and indicates displacement to the left in the BVM from the previous BVM column. In this manner the alphabetical order of the synonym vocabulary resident in memory 15 is maintained while the prerogative of affinity ordering of the synonymy encoded in the BVM is maintained.

Resident in memory 15 is a record for each word in the text vocabulary. Each record includes the alphabetic character codes for the word. The words are arranged in alphabetic order and preceded by a numeric address indicating the position of the word in the vocabulary. This places the records in alphabetic order and numeric address order to facilitate searching. Also resident in memory 15 along with the vocabulary records is a vocabulary index (VIX). This data structure facilitates the efficient access to word entries within the synonymy or antonymy data base. When accessing the data base, the VIX is used to approximately locate the word in electronic memory or on a direct access storage media such as a disk or diskette. One section of the VIX contains on alpha index which may be the first two to four characters of words in the vocabulary records (depending on the length of the vocabulary) and a starting address for records beginning with these letters in the vocabulary memory. Another section of the VIX contains the word numbers corresponding to the BVM row positions for each word and the address of the record containing each word. Since the vocabulary data base itself is in alphabetical order, the VIX is by nature sorted both alphabetically and by BVM row number. The access for an input word (one for which synonyms are desired), starts by locating its neighborhood via the alpha index using a search on the first two to four characters of the input word. Once found, the vocabulary data base is sequentially searched starting at the address indicated by the alpha index until a record is found that matches the input word.

Figure 2:
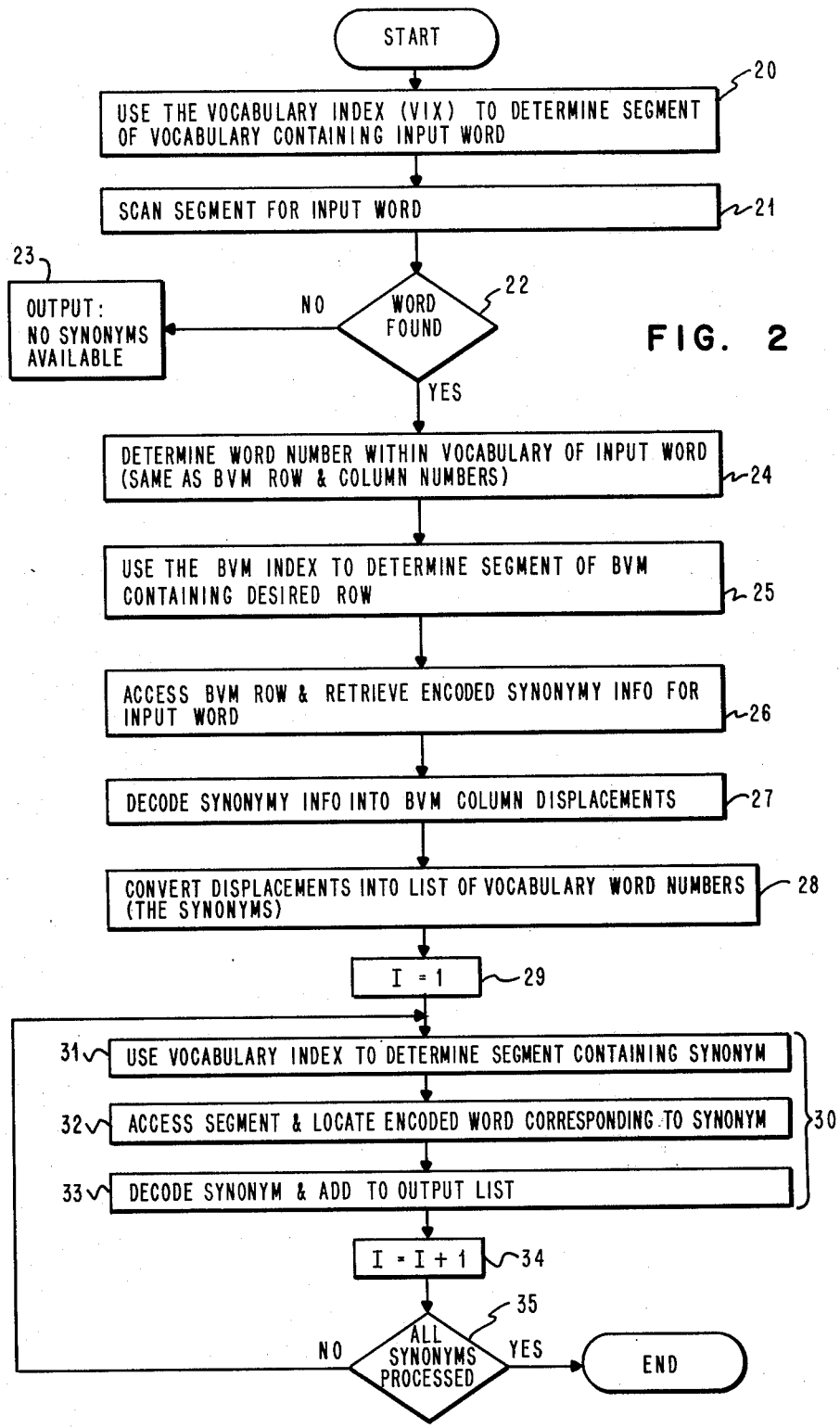
FIG. 2 is a logical flow diagram of the operation of the binary vocabulary matrix of this invention.

Referring now to FIG. 2, there is shown a logical flow diagram of the operation of the synonym generator utilizing the binary vocabulary matrix technology described above and resident in memories 12 and 15. The operation of the antonym generator is identical to the operation of the synonym generation and will not be discussed in detail herein. In the preferred embodiment, the logic is implemented as a series of instructions stored in the instruction memory 14 for controlling the operation of the processor 10. However, it will be understood that the logic can be implemented as combinational logic forming a special purpose processor or as microcode. At logic block 20, the system receives an input word and uses the first four characters of the input word to search the vocabulary index in memory 15 for the starting address in memory 15 of the vocabulary data base segment containing the input word. When the address of the segment of memory 15 containing the input word is located, at logic block 21 the alphabetic segment of the records in the segment are scanned and compared against the input word for a match in the vocabulary memory 15. If no match is found at logic block 22, an indicator that no synonym is available is output at logic block 23. The information that no synonym is available will be displayed by the processor 10 on display 3. If the word is found, then at logic block 24 the numeric section of the record is retrieved from the synonym vocabulary memory 15 and decoded to indicate the address of the row of the BVM in memory 12 which contains the synonymy information related to the word and the physical location of the respective segment of the BVM wherein this row resides. As previously stated, the location of the synonymy information in the BVM memory 12 is encoded as a row number or address stored with the text word as a record in the vocabulary memory 15. The BVM memory 12 also contains an index table of partial addresses, i.e. row numbers, for words in the BVM to enable quick access to the section of the BVM memory 12 containing the synonymy information for the word by approximating the address. The index table may be broken down into blocks of 1000 words or less depending on the size of the vocabulary used. Assuming a vocabulary of 50,000 words, then the two high-order digits of the row number or the high-order 6 bits of a 16 bit address may be used to index the binary vocabulary matrix memory 12. At logic block 25 the index information is used to determine the segment of the BVM memory 12 containing the row of synonymy information for the input word. Once the segment of the BVM memory 12 has been determined, then at logic block 26 the BVM row containing the synonymy information for the input word is accessed and the synonymy information is retrieved. As was previously stated and shown with reference to FIG. 3 the synonymy information contained in the row of the BVM memory 12 for the input word is the encoded row location of the corresponding synonyms for the input word. At logic block 27, the synonymy information is decoded into displacement values that indicate the location of the synonyms in the binary vocabulary matrix memory 12 relative to the location of the input word. At logic block 28, the displacements are converted into vocabulary word numbers (addresses) for each of the synonyms.

At block 29, "I" is set equal to the address "D" for the first word number. At logic block 31 the word number is compared to the vocabulary index which as was previously stated, is sorted in both alphabetic and numeric order, to determine the segment of the vocabulary memory 15 containing the record for the word which matches the word number. At logic block 32 the vocabulary memory segment is accessed to locate the encoded word corresponding to the synonym. At logic block 33 the synonym is decoded from the vocabulary memory 15 and added to the output list of synonyms. The vocabulary index access address is updated at logic block 34 by adding the displacement to the next word number. At logic block 35 the vocabulary index number is tested to determine if all the synonyms for the input word have been accessed. If not, a branch is taken back to logic block 31 and accessing continues. If the last synonym has been accessed the processor 10 displays the synonyms on the display 19.

While the invention has been shown and described with reference to a system for relating words within a dictionary with respect to their synonymy and antonymy it will be understood by those skilled in the art that the spirit of this invention can be implemented with respect to relating other types of information such as medical prescription names and generic names, inclusion of tense or parts of speech along with synonym and language translation terms, without avoiding the scope of the invention claimed herein.

What is claimed is:

1. A method for interactively generating a list of linguistic expressions synonymic to an input linguistic expression using a programmable digital computer system comprising the steps of:
   (a) storing in a first section of the memory of said programmable digital computer system a vocabulary of linguistic expressions including synonyms and including a presorted index to said vocabulary, each linguistic expression including address codes keyed to said index;
   (b) storing in a second section of the memory of said programmable digital computer system a two-dimensional array containing binary bits linking said address codes of said linguistic expressions stored in said first section of said memory;
   (c) comparing a segment of an input linguistic expression to said presorted index for approximating the address location of the input linguistic expression in said first section of the memory;
   (d) comparing the input linguistic expression to said vocabulary of linguistic expression stored in said first section of said memory beginning at the approximated address and storing the address code associated with the stored linguistic expression when when an equal occurs;
   (e) accessing said second section of the memory at the address specified by the stored address code;
   (f) decoding the binary bits stored at the accessed address into the corresponding address codes;
   (g) utilizing the corresponding address codes to access linguistic expressions stored in said first section of said memory;
   (h) concatenating the accessed linguistic expressions in a third section of said memory; and
   (i) displaying the input linguistic expression together with the concatenated linguistic expressions.

2. A method according to claim 1 including the step of displaying an indication no synonymic linguistic expressions exist when said input linguistic expression fails to compare to said linguistic expressions stored in said first section of said memory.

3. A method of interactively generating a list of linguistic expressions antonymic to an input inguistic expression using a programmable digital computer system comprising the steps of:
   (a) storing in a first section of the memory of said programmable digital computer system a vocabulary of linguistic expressions including a presorted index to said vocabulary, each linguistic expression including address codes keyed to said index;
   (b) storing in a second section of the memory of said programmable digital computer system a two-dimensional array containing binary bits linking said address codes of said linguistic expressions stored in said first section of said memory;

(c) comparing a segment of an input linguistic expression to a said presorted index for approximating the address location of the input linguistic expression in said first section of the memory;

(d) comparing the input linguistic expression to said vocabulary of linguistic expression stored in said first section of said memory beginning at the approximated address and storing the address code associated with the stored linguistic expression when an equal occurs;

(e) accessing said second section of the memory at the address specified by the stored address code;

(f) decoding the binary bits stored at the accessed address into the corresponding address codes;

(g) utilizing the corresponding address codes to access linguistic expressions stored in said first section of said memory;

(h) concatenating the accessed linguistic expressions in a third section of said memory; and (i) displaying the input linguistic expression together with the concatenated linguistic expressions.

4. A method according to claim 3 including the step of displaying an indication no antonymic linguistic expressions exist when said input linguistic expression fails to compare to said linguistic expressions stored in said first section of said memory.

5. A method according to claim 1 or claim 3 including the step of run-length encoding the displacement of said binary bits in said two-dimensional array.

6. A method according to claim 5 including the step of appending a code to the run-length encoded displacement of said binary bits indicative of the direction of displacement of each succeeding bit from the preceding bit.

7. A method according to claim 6 including the step of decoding said appended code and arranging the concatenated linguistic expressions in the order indicated by the direction of displacement of said binary bit.

* * * * *